E. O. CARVIN.
TIRE DEFLATION INDICATOR.
APPLICATION FILED APR. 9, 1919.

1,365,375.

Patented Jan. 11, 1921.
2 SHEETS—SHEET 1.

WITNESSES

INVENTOR
E. O. CARVIN
BY
ATTORNEYS

E. O. CARVIN.
TIRE DEFLATION INDICATOR.
APPLICATION FILED APR. 9, 1919.
1,365,375.
Patented Jan. 11, 1921.
2 SHEETS—SHEET 2.
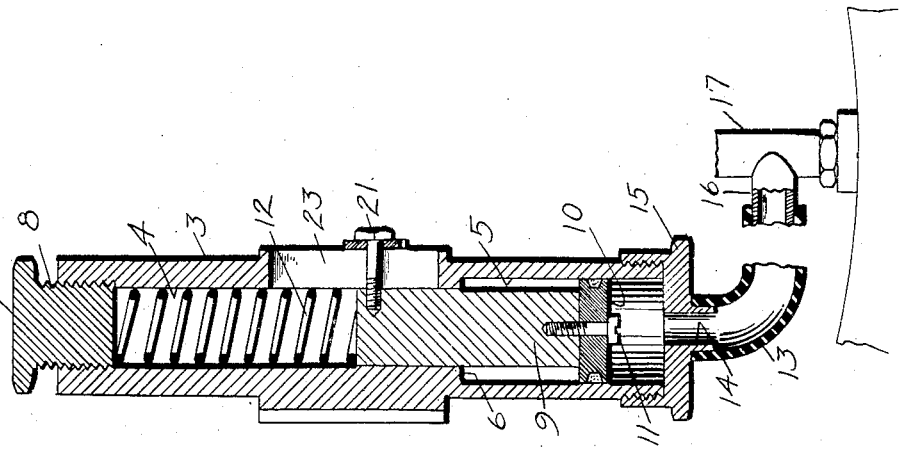
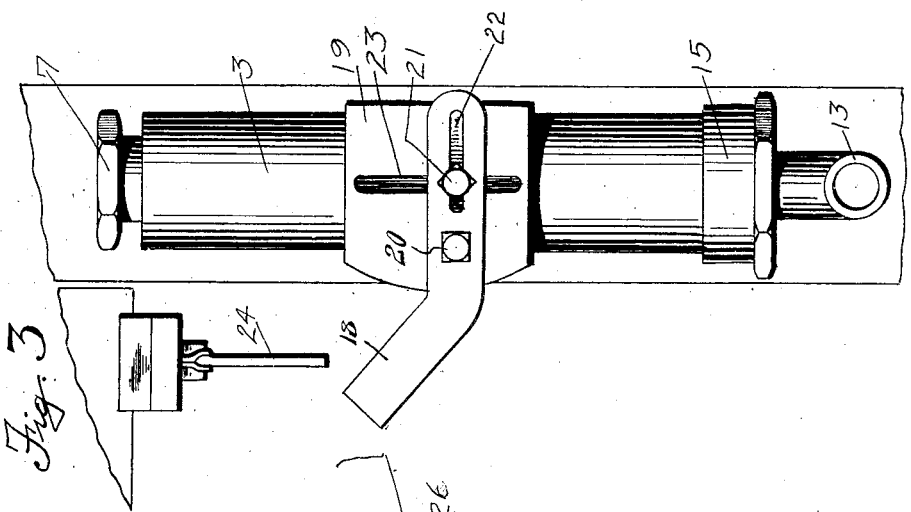
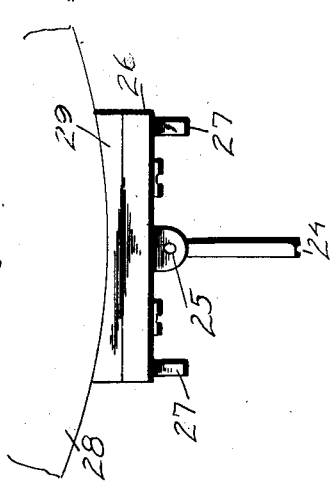
WITNESSES
INVENTOR
E. O. CARVIN
BY
ATTORNEYS

UNITED STATES PATENT OFFICE.

EDWARD O. CARVIN, OF ALLEGHANY, CALIFORNIA.

TIRE-DEFLATION INDICATOR.

1,365,375.

Specification of Letters Patent.  Patented Jan. 11, 1921.

Application filed April 9, 1919. Serial No. 288,795.

*To all whom it may concern:*

Be it known that I, EDWARD O. CARVIN, a citizen of the United States, and a resident of Alleghany, in the county of Sierra and State of California, have invented certain new and useful Improvements in Tire-Deflation Indicators, of which the following is a specification.

My invention is an improvement in tire deflation indicators, and the invention has for its object to provide mechanism for use in connection with the tires of motor vehicles, for indicating, by means of a signal, when the tire is deflated beyond a predetermined point, the signal being controlled into operative position by the deflation of the tire and being operated by the rotation of the wheel of the tire either in the forward motion or in the reverse.

In the drawings:

Fig. 2 is a vertical section through the signal controlling mechanism;

Fig. 3 is a side view;

Fig. 4 is a top plan view of the switch mechanism, showing it connected with the brake band;

Figure 1:
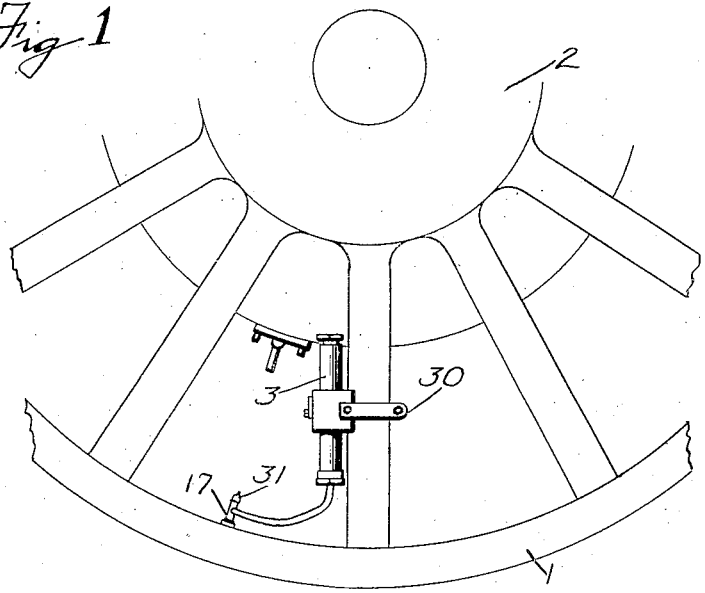
Figure 1 is a side view showing the improvement in place.

The present embodiment of the invention is shown in connection with the tire 1 of the wheel 2 of a motor vehicle, and the improvement comprises a cylinder 3 whose bore 4 is reamed or counterbored at one end, as indicated at 5, to form an annular shoulder or valve seat 6 between the portions 4 and 5 of the casing.

The portion 4 of the bore is closed at the end of the casing by a plug 7 which is threaded into the casing. A valve or piston 9 is mounted to move in the portion 4 of the bore, and this valve has a head 10 in the portion 5 of the cylinder.

The head has a packing ring, as shown, and is held to the piston by a screw 11. A spring 12 normally acts to force this valve toward the portion 5 of the casing, and it is adapted to be forced in the opposite direction by the pressure in the tire which is transmitted to the head and to the portion 5 by means of a hose 13. This hose is connected with a nipple 14 on a cap 15 which closes the end of the cylinder, and the other end of the hose is connected with a lateral nipple 16 on a tire valve casing 17.

A lever 18 is pivoted to the cylinder 3 intermediate its ends, upon a flattened surface 19 provided on the cylinder, and one end of the lever has a lost motion connection with the piston. The lever is pivoted at 20, and is connected to the piston by a screw 21. This screw passes through a slot 22 in the lever and through a slot 23 extending longitudinally of the cylinder.

The free end of the lever is adapted to engage a switch arm 24 which is pivoted at 25 to a base 26. This base has contact members 27 at its ends, and it is secured to the brake band 28 at a suitable point or at any other suitable point on the vehicle, such that it may be engaged by the lever 18 under conditions to be presently described.

As shown in Fig. 4, a block 29 is arranged between the brake band and the base, this block being concaved to fit the band. The cylinder 3 is clamped to a spoke of the wheel 2, by means of a clamp indicated at 30. The tire valve casing 17 is of usual construction, with the exception of the lateral nipple 16, and the cap 31. This cap is arranged to open the valve when screwed home, so that the pressure within the tire may be freely transmitted to the portion 5 of the cylinder and to the head of the valve. By means of the plug 7, the tension of the spring 4 may be regulated, so that when the pressure in the tire falls below a predetermined point the valve will be moved toward the tire and will operate the signal in a manner to be presently described.

This signal, which preferably is an electrically controlled signal, is arranged in an open circuit, whose terminals are connected one with the switch arm 24 and the other with the contact members 27, the arrangement being such that when the switch arm 24 is swung into contact with either contact member the circuit will be closed and the signal will be operated. While an electrical signal is specified, it is understood that with obvious changes other signals might be used.

In operation, the piston or valve 9 is normally forced toward the plug 7 by the pressure in the tire, it being understood that a cylinder 3 and associated parts is connected with each wheel. So long as this pressure is at or above a predetermined point, the valve will be so held with the lever 18 out of position to engage with the switch arm 24, as clearly shown in Fig. 3. That is, the lever will be held more or less perpendicular to the spoke until the pressure in the tire falls below this predetermined point. The spring will then force the valve outward, and the arm 18 will be swung more nearly into parallelism with the spoke and into position such that its free end will engage the switch arm 24. This switch arm is so arranged that when swung toward either contact member 27 it will continue to swing into engagement therewith, and will close the circuit and cause the signal to be actuated. The mechanism might be connected with the usual horn, electrically controlled, or with the motor to stop the same if desired, or in any other suitable or desired manner.

Figure 5:
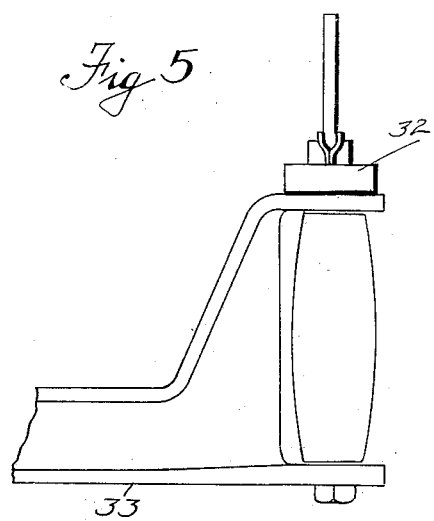
Fig. 5 is a front view of the said mechanism showing the manner of connecting it to the steering knuckle.

As shown in Fig. 5, the switch, indicated generally at 32 and which corresponds in all respects to the switch shown in Figs. 3 and 4, is attached to the forward axle 33. The head 10 of the piston is a valve which closes the bore 5 and which, when the piston is in outermost position, will contact with the shoulder 6.

I claim:

In a motor vehicle, the combination with the tires, of a pressure controlled means adjacent to each tire and connected therewith to be controlled by the pressure in the tire, signal controlling mechanism adjacent to the said means and past which the said means moves at the movement of the tire, the said pressure controlled means comprising a cylinder having a plunger therein moved in one direction by the pressure in the tire, a spring for moving the plunger in the opposite direction, a lever pivoted to the cylinder intermediate its ends and having a lost motion connection with the plunger, the signal controlling means consisting of a switch arm mounted to swing and normally extending into the path of movement of the lever when the plunger is influenced by the spring.

EDWARD O. CARVIN.